United States Patent
Kim et al.

(10) Patent No.: US 10,090,518 B2
(45) Date of Patent: Oct. 2, 2018

(54) SULFATE CONTAINING RECHARGEABLE BATTERY CATHODE WITH OXIDIZED SURFACE

(71) Applicants: Umicore, Brussels (BE); Umicore Korea Ltd., Chungnam (KR)

(72) Inventors: Dae-Hyun Kim, Cheonan (KR); Jens Paulsen, Daejeon (KR)

(73) Assignees: Umicore, Brussels (BE); Umicore Korea, Ltd., Chungnam (KR)

( * ) Notice: Subject to any disclaimer, the term of this patent is extended or adjusted under 35 U.S.C. 154(b) by 103 days.

(21) Appl. No.: 15/121,439

(22) PCT Filed: Feb. 25, 2015

(86) PCT No.: PCT/IB2015/000229
§ 371 (c)(1),
(2) Date: Aug. 25, 2016

(87) PCT Pub. No.: WO2015/128722
PCT Pub. Date: Sep. 3, 2015

(65) Prior Publication Data
US 2016/0365571 A1    Dec. 15, 2016

(30) Foreign Application Priority Data

Feb. 27, 2014    (EP) .................................. 14156985
Apr. 9, 2014    (EP) .................................. 14164029

(51) Int. Cl.
  *H01B 1/06*    (2006.01)
  *H01B 1/08*    (2006.01)
  (Continued)

(52) U.S. Cl.
  CPC ............. *H01M 4/366* (2013.01); *H01B 1/06* (2013.01); *H01B 1/08* (2013.01); *H01M 4/131* (2013.01);
  (Continued)

(58) Field of Classification Search
  CPC ........... H01M 10/052; H01M 10/0525; H01M 2004/028; H01M 4/131; H01M 4/364;
  (Continued)

(56) References Cited

U.S. PATENT DOCUMENTS

| 8,535,832 B2 | 9/2013 | Karthikeyan et al. |
| 2003/0044684 A1* | 3/2003 | Nanamoto ............ H01M 4/133 |
| | | 429/231.1 |

(Continued)

FOREIGN PATENT DOCUMENTS

| EP | 2463942 | 6/2012 |
| JP | 2001-273898 | 10/2001 |
| JP | 2004-281255 | 10/2004 |

OTHER PUBLICATIONS

Wang, Q.Y., et al. "High Capacity Double-Layer Surface Modified Li[Li0.2M0.5Ni0.13Co0.13]O2 Cathode with Improved Rate Capability", Journal of Materials Chemistry, vol. 19, No. 28 (Jun. 5, 2009), pp. 4965-4972.

(Continued)

*Primary Examiner* — Mark Kopec
*Assistant Examiner* — Jaison P Thomas
(74) *Attorney, Agent, or Firm* — NK Patent Law

(57) ABSTRACT

A method for preparing a positive electrode material for a rechargeable lithium battery, comprising the steps of: —providing a Li metal (M) oxide electroactive material, —providing an inorganic oxidizing chemical compound, —providing a chemical that is a Li-acceptor, —mixing the Li metal (M) oxide, the oxidizing compound and the Li-acceptor, and —heating the mixture at a temperature between 200 and 800° C. in an oxygen comprising atmosphere. In an embodiment the positive electrode material comprises a Li metal (M) oxide electroactive material, and between 0.15 and 5 wt % of a LiNaSO4 secondary phase. The Li metal oxide may have the general formula $Li_{1+a'}$ (Continued)

(a)

(b)

$M_{1-a'}O_2$, with $a'<a$ and $0.9\leq(1+a')/(1-a)\leq1.15$, and $M=Ni_{1-x-y}M'xCo_y$, with $M'=Mn_{1-z}Al_z$, $0\leq z\leq 1$, $0.1\leq y\leq 0.4$ and $x+y\leq 0.5$.

18 Claims, 4 Drawing Sheets

(51) Int. Cl.
    *H01M 4/36*     (2006.01)
    *H01M 4/505*     (2010.01)
    *H01M 4/525*     (2010.01)
    *H01M 4/131*     (2010.01)
    *H01M 4/62*     (2006.01)
    *H01M 10/0525*     (2010.01)
    *H01M 10/052*     (2010.01)
    *H01M 4/02*     (2006.01)

(52) U.S. Cl.
    CPC ........... *H01M 4/364* (2013.01); *H01M 4/505* (2013.01); *H01M 4/525* (2013.01); *H01M 4/62* (2013.01); *H01M 10/0525* (2013.01); *H01M 10/052* (2013.01); *H01M 2004/028* (2013.01)

(58) Field of Classification Search
    CPC ...... H01M 4/366; H01M 4/505; H01M 4/525; H01M 4/62; H01B 1/08; H01B 1/06
    See application file for complete search history.

(56) References Cited

U.S. PATENT DOCUMENTS

| | | |
|---|---|---|
| 2005/0118511 A1 | 6/2005 | Park |
| 2006/0071198 A1 | 4/2006 | Paulsen |
| 2012/0070725 A1 | 3/2012 | Venkatachalam |
| 2017/0179479 A1* | 6/2017 | Park .................. H01M 10/0587 |

OTHER PUBLICATIONS

Song, H.G., et al., "Enhanced Electrochemical Properties Li(Ni0.4Co0.3Mn0.3)O2 Cathode by Surface Modification using Li3PO4-based Materials", Journal of Power Sources, vol. 196, No. 16 (Sep. 14, 2010), pp. 6847-6855.

European Search Report for EP 14 15 6985, dated Jun. 13, 2014.

Wu, Yingqiang, et al., "Simultaneous surface coating and chemical activation of the Li-rich solid solution lithium rechargeable cathode and its improved performance" Electrochimica Acta, vol. 113 (Epub: Sep. 29, 2013), pp. 54-62.

Zheng, Jun, et al., "The effects of persulfate treatment on the electrochemical properties of Li [Li0.2Mn0.54Ni0.13Co0.13]O2 cathode material", Journal of Power Sources, vol. 221 (Epub: Aug. 14, 2012), pp. 108-113.

International search report for PCT/IB2015/000229, dated Jul. 27, 2015.

\* cited by examiner (a)

(b)

(a)

(b)

SULFATE CONTAINING RECHARGEABLE BATTERY CATHODE WITH OXIDIZED SURFACE

This application is a National Stage application of International Application No. PCT/IB2015/000229, filed Feb. 25, 2015. This application also claims priority under 35 U.S.C. § 119 to European Application No. 14156985.5, filed Feb. 27, 2014 and European Application No. 14164029.2, filed Apr. 9, 2014.

TECHNICAL FIELD AND BACKGROUND

This invention relates to improved cathode materials for rechargeable lithium ion batteries. The cathode material contains Ni, Mn and Co, is surface treated and has a modified composition which shows improved cycle stability during long term cycling in full cells, especially at elevated temperatures. The modified material also shows an improved stability when cycled at high voltages. Additionally the content of soluble base is low.

A cathode of a lithium rechargeable battery is usually a powderous material capable to reversibly intercalate and de-intercalate lithium. The powder is deposited as an electrode film onto a metal foil acting as a current collector. The electrode film often contains more than 95% of the cathode material as well as small amounts of binder and conductive additive. The thus prepared positive electrode is stacked or wound with a separator and a negative electrode film (anode). Typically the negative electrode film contains carbon. Finally the stacked or wound cathode-separator-anode-roll is inserted into a case, electrolyte is added and the case is sealed, resulting in a full cell.

Historically $LiCoO_2$ was the dominating cathode material for rechargeable lithium batteries. Recently the so-called NMC cathode materials replace $LiCoO_2$ in many applications. "NMC" is an abbreviation of nickel-manganese-cobalt and is used for lithium transition metal based oxides, where the transition metal is a mixture of basically Ni, Mn and Co, and having roughly the stoichiometry $LiMO_2$, where $M=Ni_xMn_yCo_z$. Additional doping is possible, typical doping elements are Al, Mg, Zr etc. The crystal structure is an ordered rocksalt structure, where the cations order into 2 dimensional Li and M layers. The space group is R-3M. There are many different compositions possible, often categorized and named after their nickel manganese and cobalt content. Typical NMC based materials are "111" where $M=Ni_{1/3}Mn_{1/3}Co_{1/3}$, "442" with $M=Ni_{0.4}Mn_{0.4}Co_{0.2}$, "532" with $M=Ni_{0.5}Mn_{0.3}Co_{0.2}$, "622" with $M=Ni_{0.6}Mn_{0.2}Co_{0.2}$ etc.

The composition of NMC is normally characterized by (1) the Li:M molar ratio, (2) the cobalt content Co/M, and (3) the so-called nickel excess (Ni—Mn)/M, as follows:

(1): Generally the Li to M stoichiometric ratio is near to, but often not exactly unity. If Li:M increases Li replaces M on M layer sites and the structure can—simplified—be written as $Li_1[M_{1-x}Li_x]O_2$ or $Li_{1+x}M_{1-x}O_2$, where Li:M=(1+x)/(1−x). Typical Li:M is close to 1.10 for "111" and "442"; and close to 1.02 for "622". One effect of increasing the Li:M stichiometric ratio is that the cation mixing is changed. Cation mixing refers to the fact that the actual crystal structure is not exactly layered $LiMO_2$ or $Li_1[M_{1-x}Li_x]O_2$, but rather $\{Li_{1-x'}M_{x'}\}[M_{1-y}Li_y]O_2$, where x' stands for M atoms that are located on Li layer sites, which results in so-called "cation mixing". In NMC we typically observe some degree of cation mixing. It is believed that cation mixing hinders a very fast Li diffusion, thus limiting the rate performance and power of NMC cathode materials.

(2): The cobalt content is important for stabilizing a well layered structure. If the cobalt content Co/M is less than about 10-20 mol %, then often increased cation mixing is observed. On the other hand cobalt is more expensive than Ni and Mn, and hence many NMC cathode materials have a cobalt content of 15-33 mol % as an optimized value.

(3): The nickel excess is an important stoichiometric parameter. As (Ni—Mn)/M increases the reversible capacity increases, but at the same time the cathode material becomes increasingly difficult to prepare. "111" with Ni excess=0 is a robust material that can be easily prepared by sintering e.g. a mixed NMC hydroxide (for example precipitated from an aqueous solution of Ni—, Mn—, and Co sulfates) together with cheap $Li_2CO_3$ as lithium source in a flow of air at high throughput. High Ni cathodes—like "811"—often require sintering in pure oxygen, at lower throughput, and instead of $Li_2CO_3$ the more expensive and more difficult to handle $LiOH*H_2O$ must be used as Li source. With increasing Ni excess it is increasingly difficult to control the content of soluble base. High Ni material tend to have a very high base content, which is a severe issue for many applications.

Background of soluble base content: when a cathode material $LiMO_2$ is inserted in water then the pH of the water increases. The pH increase is caused by (a) dissolution of surface impurities like $Li_2CO_3$ and $LiOH*H_2O$, (b) reactions of surface molecules/surface groups with water, and (c) ion exchange reactions where lithium present in the top layers of the bulk of the material is exchanged for protons following the reaction $Li^+ + H_2O \rightarrow H^+ + LiOH$. The pH increase is utilized in techniques called "pH titration" for determining the soluble base content. In a typical pH titration experiment a certain amount of cathode powder (e.g. 2.5 g) is added to an amount of water (e.g. 100 ml), the suspension is stirred during a fixed time (e.g. 10 min), followed by filtering. The pH titration itself shows a pH profile as function of an amount of added acid (e.g. 0.1 M HCl). In many cases the pH profile can be easily explained based on the presence of the mixture of carbonate ($Li_2CO_3$) and hydroxide (LiOH). By certain manipulations the contents of LiOH base, $Li_2CO_3$ base, $B_T$ (total base) etc. are obtained, as is explained in e.g. WO2012/107313, which is incorporated here by reference.

pH titration is a sensitive tool to investigate the surface properties of cathode materials. Since the cell performance of cathode materials depends on its surface properties—because parasitary reactions occur at the electrolyte/particle interface—it could be expected—and experience has shown—that pH titration is a powerful tool to design cathode materials. As an example, in WO2012/107313 it is shown that results of pH titration correlate well with many full cell properties and cell making properties. A high base content for example correlates with increased bulging (internal gas evolution) of full cells, where typical tests include the measurement of the thickness increase of fully charged cells, and electrode slurry stability issues with different binders: both in water-based electrode coatings, and in NMP (N-Methyl-2-pyrrolidone) based electrode coatings a high base content causes issues like aluminum foil corrosion (for water based coatings) or slurry viscosity changes (for NMP based coatings).

Regarding portable applications, NMC is not yet penetrating into the high end portable devices, for example in polymer cells for smartphones. A major reason is that either the volumetric energy density is too low (if the Ni excess is much below 20%) or—if the capacity is sufficient (such as for a Ni excess (far) above 20%)—then the high content of soluble base causes bulging, which cannot be tolerated. In low end portable applications NMC is replacing $LiCoO_2$.

A typical example is cylindrical or prismatic cells for notebooks. The rigid case tolerates some internal gas evolution, so NMC with ≥20% Ni excess can be applied. Typical electrode test schedules include continuous full charge—discharge cycling where the typical target is to exceed 80% of initial reversible capacity after 500 cycles. In some applications which use advanced high voltage $LiCoO_2$ the charge voltage has been increased to 4.35V or even 4.4V. NMC can only challenge $LiCoO_2$ if the NMC can be cycled in a stable manner at 4.35V or even 4.4V in full cells. Summarizing: important properties for NMC cathode materials for portable applications include a high capacity and low bulging with an acceptable cycling stability.

Regarding automotive applications, the batteries are larger than portable batteries and thus more expensive. Therefore, quite generally, the requirements for cathode price, cycle stability and calendar life are much more demanding compared to portable applications. Also, batteries might operate at higher temperatures, so requirements for high T cycling stability are stricter. $LiCoO_2$, due to its cost and limited calendar life, is much less considered as cathode material for automotive applications than NMC. Typical test schedules include continuous full charge discharge—cycling where the typical target is to exceed 80% of initial reversible capacity after 2000 cycles both when cycling at 25° C. as well as when cycling at 45° C. with a charge voltage of 4.2V. Because of tough battery life requirements, a typical charge voltage during application is even lower than 4.2V. NMC which cycles in a stable way at higher voltage might be of interest to increase the charge voltage during its use. An automotive battery contains many cells, controlled by a battery management system. To lower system cost a more simple battery management system is desired. One contribution to the cost is the heating/cooling system which ensures that the cells operates at the appropriate temperature. At low temperatures the battery has insufficient power, whereas at high temperature the cycle stability becomes a concern. Obviously the system cost can be reduced if the automotive cathode materials support stable cycling not only at 25° C. but also at higher temperature.

Some automotive applications (for example hybrid electric vehicles or HEV) require very high power. This is due to the high charge/discharge rates during regenerative braking and acceleration. A high power output requires (1) electronically high conductive electrodes, (2) thin electrodes and (3) cathode materials which support high charge/discharge rates. NMC with a high Ni excess is especially suited for this application, because (1) the electronic conductivity increases with Ni excess, (2) as capacity increases with Ni excess electrodes can be made thinner and (3) often power (for fixed Co stoichiometry) increases with Ni excess. Summarizing: Important properties for NMC cathode materials for automotive applications include high capacity and good cycle stability both at normal (25° C.) as well as at elevated temperature.

An object of the present invention is to provide NMC cathode materials with Ni excess that are showing improved properties required for high end portable and automotive applications.

SUMMARY

Viewed from a first aspect, the invention can provide a positive electrode material for a rechargeable lithium battery comprising a Li metal (M) oxide electroactive material, and between 0.15 and 5 wt % of a $LiNaSO_4$ secondary phase. In one embodiment $M=Ni_{1-x-y}M'_xCo_y$, with $M'=Mn_{1-z}Al_z$, $0 \leq z \leq 1$, $0.1 \leq y \leq 0.4$ and $x+y \leq 0.5$. In another embodiment $1-y-2x>0.2$.

According to an embodiment of the invention, the Li metal oxide has the general formula $Li_{1+a'}M_{1-a'}O_2$, with $a'<a$ and $0.9 \leq (1+a')/(1-a) \leq 1.15$, and preferably $1 \leq (1+a')/(1-a) \leq 1.10$. According to another embodiment, the mass fraction of the $LiNaSO_4$ secondary phase is between 0.2 and 2 wt %, or even between 0.3 and 2 wt %.

The positive electrode material according to the invention may consist of a core comprising the Li metal (M) oxide and a coating comprising the $LiNaSO_4$ secondary phase. The positive electrode material may have a secondary phase that further comprises up to 1 wt % of either one or more of $Al_2O_3$, $LiAlO_2$, $LiF$, $Li_3PO_4$, $MgO$ and $Li_2TiO_3$. In one embodiment the $LiNaSO_4$ coating is covered by a second coating comprising either one or more of $Al_2O_3$, $LiAlO_2$, $LiF$ and $MgO$, and wherein the second coating represents up to 1 wt % of the material.

In other embodiments, the Li metal (M) oxide is doped with up to 2 mol % of either one or more of Al, Ti, Mg and Zr; or the Li metal (M) oxide is doped with up to 0.2 mol % of either one or more of Ca, Sr, Si, F, P and K. It is clear that the products according to the invention may be provided with features that are covered by different product embodiments.

Viewed from a second aspect, the invention can provide a method for preparing a positive electrode material for a rechargeable lithium battery, comprising the steps of:
providing a Li metal (M) oxide electroactive material,
providing an inorganic oxidizing chemical compound,
providing a chemical that is a Li-acceptor,
mixing the Li metal (M) oxide, the oxidizing compound and the Li-acceptor, and
heating the mixture at a temperature between 300 and 800° C. in an oxygen comprising atmosphere, such as air. If the oxidizer is in contact with the Li metal (M) oxide at a temperature below 300° C. no oxidizing reaction takes place, since the surface does not sufficiently respond to the oxidizing attack. At about 300° C. the oxidizer—surface interface becomes sufficiently reactive so that in effect the oxidizer modifies the surface properties. The induced change of surface chemistry is probably caused by the oxidation of the surface, and causes an excellent electrochemically performance.

In one embodiment, the Li metal oxide has the general formula $Li_{1+a'}M_{1-a'}O_2$, with $a'<a$ and $0.9 \leq (1+a')/(1-a) \leq 1.15$, and $M=Ni_{1-x-y}M'_xCo_y$, with $M'=Mn_{1-z}Al_z$, $0 \leq z \leq 1$, $0.1 \leq y \leq 0.4$ and $x+y \leq 0.5$. In another embodiment the inorganic oxidizing chemical compound is $NaHSO_5$, or either one of a chloride, a chlorate, a perchlorate and a hypochloride of either one of potassium, sodium, lithium, magnesium and calcium. In still another embodiment the Li-acceptor chemical is either one of $AlPO_4$, $Li_3AlF_6$ and $AlF_3$. In a particular embodiment, both the inorganic oxidizing chemical compound and the Li-acceptor chemical are the same compound, being either one of $Li_2S_2O_5$, $H_2S_2O_8$ and $Na_2S_2O_8$. In the positive electrode material, the mass fraction of the Li metal (M) oxide in the mixture may be between 95 and 99.8 wt %. In the method according to the invention, the $Na_2S_2O_5$ may be mixed with the Li metal (M) oxide in a dry process. A nanosized $Al_2O_3$ powder may be provided as a further Li-acceptor chemical. In one method embodiment, the heating temperature is between 300 and 600° C. Preferably the heating temperature is between 350 and 450° C. The heat treatment takes at least 1 hr and should not take more than 12 hrs. It is clear that the methods according to the invention may be provided with features that are covered by different method embodiments.

The current invention discloses a treatment for cathode materials which—compared to the untreated cathode material—allows to improve cycle stability and reduce bulging, meaning that this effect will be reached for NMC cathode materials with moderate (≥20%) to high (≤80%) Ni excess without deteriorating the capacity. The treatment is particularly effective to achieve good cycle stability at elevated temperature (45° C.) and at higher voltage (4.35V).

It should be mentioned here that a heat treatment of cathode materials using sodium persulfate, followed by a rinsing step to remove the salt products, was suggest by Zheng, Jun et al. in both CN102208607A and "The effects of persulfate treatment on the electrochemical properties of $Li[Li_{0.2}Mn_{0.54}Ni_{0.13}Co_{0.13}]O_2$ cathode material", Power Sources 221 (2013) 108-113. The intention of the treatment is to reduce the large first cycle irreversible capacity of lithium rich cathode materials. This approach here is different from the approach disclosed in the present invention.

First, CN'607A discloses to use large amounts of $Na_2S_2O_8$ so that sufficient Li is extracted. The patent claims to add at least 5 wt % of $Na_2S_2O_8$, and examples add up-to 60 wt %. In the present application however, less than 3 wt % is added because an extraction of significant amounts of Li is not advised, the purpose here is an effective oxidation of the cathode surface. Extraction of a large amount of Li will lead to undesired lower capacities.

Second, CN'607A focuses on Li rich cathodes. Such cathodes (for example $Li[Li_{0.2}Mn_{0.54}Ni_{0.13}Co_{0.13}]O_2$) have very different properties compared with the Ni rich NMC of the current patent application. Li rich cathodes generally have a relatively high Mn and a relatively low Ni content, resulting in a Ni excess which is small, zero or even negative. The current application focuses on NMC with excess Ni and a Li/M ratio close to 1.

Third, in the CN'607A process the $Na_2S_2O_8$ is added in dissolved form, whereas the current application applies a different method. This results in very different surface properties. The surface of Ni excess cathodes gets damaged by a water treatment, such as used in CN'607A. As an example, the authors observed that Ni excess material generally shows a poor cycle stability after water exposure, if the exposure is not followed by a high T (above 500° C.) temperature treatment to "heal" the surface. These temperatures are however so high that the surface equilibrates so that the oxidizing effect of the $Na_2S_2O_8$ treatment is lost.

Finally, the CN'607A process includes a washing step of the cathode material to remove the reaction products of $Na_2S_2O_8$ whereas the application of a washing step is not considered within this patent application. Moreover, the presence of a secondary $LiNaSO_4$ phase within the final cathode is an integral part of the current invention, which phase is not formed in the prior art.

Other prior art involving sodium persulfate includes US patent application US2006/057466, where a $K_2S_2O_8$ solution is used to oxidize $M(OH)_2$ precursors towards MOOH. US'466 discloses an advanced precipitation process where $LiMO_2$ is directly precipitated by a reaction of metal (Co, Ni, Mn . . . ) with an oxidizer in the presence of LiOH.

Further prior art:

EP2463942 provides a lithium mixed transition metal oxide having a composition $Li_xMyO2$ wherein lithium ions intercalate into and deintercalate from mixed transition metal oxide layers ("MO layers") and some of MO layer-derived Ni ions are inserted into intercalation/deintercalation layers of lithium ions ("reversible lithium layers") thereby resulting in the interconnection between the MO layers. The lithium mixed transition metal oxide is substantially free of water-soluble bases, and thereby can provide excellent storage stability, decreased gas evolution and consequently superior high-temperature stability.

US2012/070725 provides a positive electrode material comprising lithium metal oxide coated with an inorganic coating composition wherein the coating composition comprises a metal chloride, metal bromide, metal iodide, or combinations thereof.

US2006/071198 provides a powdered lithium transition metal oxide comprising a lithium transition metal oxide particle, a cathion doped interface layer formed near the surface of the particle, and a thermodynamically and mechanically stable outer layer. The doped interface layer is a reaction product of (i) the lithium transition metal oxide and (ii) a strong lithium acceptor compound supplying the cation.

US2003/044684 provides a nonaqueous electrolytic secondary battery excellent in cycle life characteristics and characteristics in discharge at a high rate as well as in safety in overcharge without reducing the discharge capacity by using a positive active material, which is obtained from starting materials containing Na and S by a production step such as water-washing treatment after synthesis and which contains less than 0.1 percent by weight of the sulfate group ($SO_4^{2-}$), less than 0.024 percent by weight of Na and/or less than 0.13 percent by weight of lithium sodium sulfate ($LiNaSO_4$).

In *J. Mater. Chem.*, 2009, 19, 4965-4972, Wang et al. describe a layered $Li[Li_{0.2}Mn_{0.54}Ni_{0.13}Co_{0.13}]O_2$, which is a solid solution between layered $Li[Li_{1/3}Mn_{2/3}]O_2$ and $Li[Ni_{1/3}Mn_{1/3}Co_{1/3}]O_2$, which is surface modified by single-layer coating with 2-5 wt. % $AlPO_4$, $CoPO_4$, and $Al_2O_3$ and double-layer coating with 2 wt. % $AlPO_4$ or 2 wt. % $CoPO_4$ inner layer and 2-3.5 wt. % $Al_2O_3$ outer layer.

In Journal of Power Sources, 2011, 196, Issue 16, 6847-6855, Song et al. describe how the surface of a commercial $Li[Ni_{0.4}Co_{0.3}Mn_{0.3}]O_2$ cathode is modified using $Li_3PO_4$-based coating materials.

In *J. Mater. Chem. A*, 2014, 2, 7555-7562, Fu et al. describe the electrochemical performance and thermal stability of $Li_{1.18}Co_{0.15}Ni_{0.15}Mn_{0.52}O_2$ n surface coated with the ionic conductor $Li_3VO_4$.

DETAILED DESCRIPTION

Figure 1:
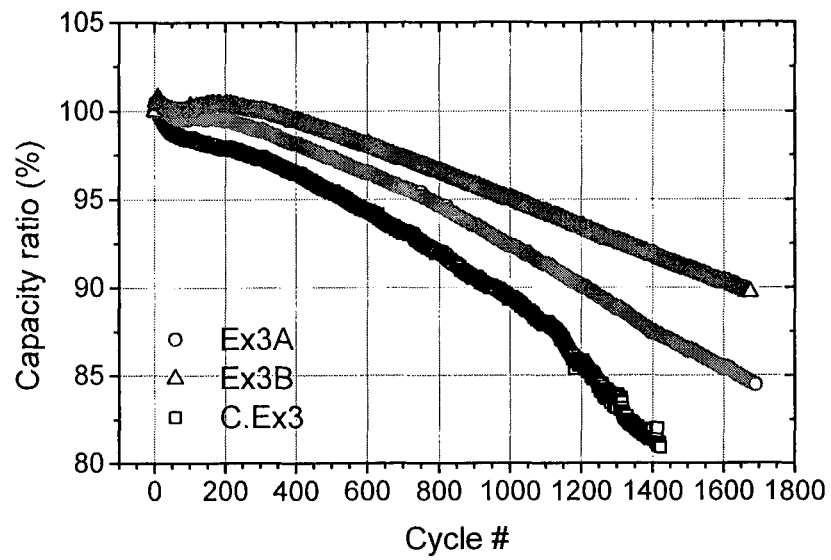
FIG. 1: Full cell cycle life test results of oxidized NMC (622) and normal NMC (622) at (a) 25° C. and (b) 45° C. The testing voltage is between 4.2V and 2.7V.
Figure 1:
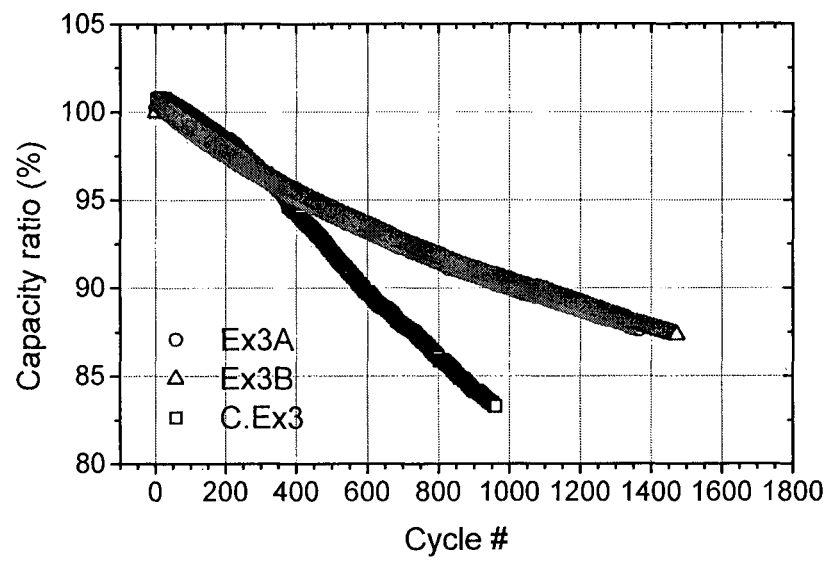

In one embodiment the invention focuses on NMC with moderate Ni excess. Ni excess refers to the difference between Ni and manganese content. Typical compositions include NMC "532" and "622", where the Ni excess is 20 mol % and 40 mol % respectively. The cathode is mixed with sodium persulfate $Na_2S_2O_8$, which is the sodium salt of the "Marshall's acid" (this is also known as peroxydisulfuric acid, a sulfur oxoacid with the chemical formula $H_2S_2O_8$) and which is a chemical that is available at large scale. $Na_2S_2O_8$ is known as a strong oxidizing agent, related to the strong cation accepting property. Example 7 below demonstrates that sodium persulfate decomposes $Li_2CO_3$ to form $LiNaSO_4$, thereby releasing reactive oxygen according to the reaction scheme:

$$Na_2S_2O_8 + Li_2CO_3 \rightarrow 2LiNaSO_4 + CO_2 + 0.5O_2 \quad (1)$$

Reaction (1) can be interpreted that $Na_2S_2O_8$ is a lithium acceptor, which is strong enough to decompose lithium carbonate.

As generally spoken the soluble base mechanism in lithium transition metal cathode materials can be understood as the result of the Li accepting properties of water—in a simplified picture—after treating the cathode material with a strong lithium acceptor it is expected that the soluble base as measured by the pH titration is decreased, simply because less base forming lithium will be available.

As will be discussed below, the authors believe that both properties—oxidation and lithium accepting properties—are strongly desired for the preparation of improved cathode materials. After applying $Na_2S_2O_8$ some of the following schematic reactions are expected:

1) Decomposition of soluble base forming $Li_2CO_3$ surface impurities present on the cathode surface according to reaction (1)
2) Decomposition of soluble base forming LiOH or $Li_2O$ surface impurities present on the cathode surface according to reactions (2) and (3)

$$Na_2S_2O_8 + 2LiOH \rightarrow 2LiNaSO_4 + H_2O + 0.5O_2 \quad (2)$$

$$Na_2S_2O_8 + Li_2O \rightarrow 2LiNaSO_4 + 0.5O_2 \quad (3)$$

3) Oxidation of reducible surface groups (e.g. hydroxile groups, etc. . . . ) by reactive oxygen originating from reaction (1), (2) & (3). Very simplified reaction:

$$2(MO-OH) + \tfrac{1}{2}O_2 \rightarrow MO_2 + H_2O \quad (4)$$

4) Partial extraction of Li from the crystal structure near to the surface thereby oxidizing the transition metal M: schematically $$yNa_2S_2O_8 + LiMO_2 \rightarrow 2yLiNaSO_4 + Li_{1-2y}MO_2 \quad (5)$$

In cathode materials Li is mobile already at room temperature. At temperatures above about 300° C., if a strong oxidizer and lithium acceptor like $Na_2S_2O_8$ is present the cathode material surface will be equilibrated with the high oxygen partial pressure according to reactions (1)-(5). If, however, the temperature is too high (i.e. >800° C.), then the bulk will equilibrate with the oxygen partial pressure of the gas phase, then surface base would be re-created towards the equilibrium value, and the surface oxygen potential will equilibrate towards the potential of 20% oxygen in nitrogen at this temperature. Between 300 and 800° C. there is a region where the reactive oxygen evolved in reactions (1)-(5) strongly oxidizes the surface of the cathode. This results in the reduction of soluble base and an improvement of the cycle stability in full cells.

A variety of methods may be used for the $Na_2S_2O_8$ treatment by itself, or in combination with a coating, as will be described below. These methods include: dry coating (coating of submicron or nanosized powder onto the surface of NMC particles), spray coating with solutions containing the coating precursor as well as the $Na_2S_2O_8$, spray coating with oxide or phosphate sols, mixing with solutions followed by evaporation etc. It is important that the heat treatment temperature after applying the coating is high enough in order to decompose the soluble base. At the same time the temperature should not be too high to prevent the base of being recreated by equilibration of the oxygen partial pressure.

Typical temperatures exceed 300° C. but are below 800° C., more preferably they are less than 600° C., most preferably more than 350° C. but less than 450° C. In this region the reaction takes place at an acceptable rate, hence there is no need to heat the material at higher temperatures.

An important aspect is the low melting point of $Na_2S_2O_8$. At 180° C. the salt melts. The liquid salt is much more reactive than the solid. It is expected that—as the temperature increases—the starting reactions between the oxidizing and Li accepting melt, and the cathode surface, causes an excellent wetting of the melt to the surface. In this way a good coating will be achieved even in the case that the $Na_2S_2O_8$ coating itself was not a perfect dry coating covering the surface but rather a blending.

Reactions (1)-(5) above propose that—after treating a NMC cathode with $Na_2S_2O_8$ the final cathode material co-exists with $LiNaSO_4$. In fact, $LiNaSO_4$ is identified as a minority phase in the XRD diffraction pattern. The minority phase can easily be removed by washing in water. However, the authors have found that this sodium impurity does not need to be removed; and that the presence of this minority phase in the final battery appears to facilitate further improvement of cycle stability.

Examples 1-3 will show that samples treated in this region have improved high voltage cycle stability in full cells. Other attempts to improve cycle stability—as treatment in a gas with low oxygen partial pressure (e.g. $air+N_2$ mixtures), treatment by coatings which tend to reduce the surface (polymer, carbon, etc. . . . ), quenching from high temperature (which will result in less oxidized surface) failed, and in fact the performance deteriorated. Without giving clear evidence the authors believe that a full oxidation of the surface is beneficial for cycle stability in full cells, especially at high temperature as well as at high voltage.

The decomposition of soluble surface base can be further enhanced by combining the treatment with $Na_2S_2O_8$ with other coating techniques. As an example—$Na_2S_2O_8$ treatment could be combined with $AlF_3$ (or $Li_3AlF_6$), $AlPO_4$, $Al(OH)_2$ or $Al_2O_3$ treatment. Both the fluorides, the phosphates, the oxide and the hydroxide are lithium acceptors which can help to decompose the soluble base and at the same time create an oxide $Al_2O_3$ or $LiAlO_2$ surface film according to the following reactions:

$$2AlF_3 + 3Li_2CO_3 \rightarrow 6LiF + Al_2O_3 + 3CO_2$$

$$2AlPO_4 + 4Li_2CO_3 \rightarrow 2Li_3PO_4 + Al_2O_3 + Li_2CO_3 + 3CO_2$$

$$Al_2O_3 + Li_2CO_3 \rightarrow 2LiAlO_2$$

$$2Al(OH)_3 + Li_2CO_3 \rightarrow 2LiAlO_2 + 3H_2O + CO_2$$

Coating techniques are not limited to aluminum. Other possible coating techniques include but are not limited to magnesium, titanium, fluorine etc.

As reported before, the authors believe that the combined effect of (a) decomposition of soluble base according to reactions (1)-(2) and (b) the oxidation according reactions (3)-(5) is the reason for the improved electrochemical performances. Such mechanisms could in principle be achieved by using a similar treatment but with different chemicals. An obvious candidate is the Li salt of the Marshall's acid, $Li_2S_2O_8$. Whereas $Na_2S_2O_8$ is a commercial material, $Li_2SO_8$ seems not to be available. However it could easily be prepared, for example by neutralizing Marshall's acid with $Li_2CO_3$ or LiOH, or by applying other suitable methods. The authors believe that the reaction mechanism and performance of the treated cathode material is very similar, with one exception—the final cathode does not contain the $LiNaSO_4$ minority phase but instead of this, significant amounts of $Li_2SO_4$ will be present.

There are many other potential oxidative chemicals, and what is important is that the chemical of choice is—or the mixture of chemicals of choice comprise—(a) a lithium acceptor and (b) an oxidizer. So mixtures of any oxidizer, preferably chosen from inorganic compounds with any Li acceptor, also preferably an inorganic compound, can potentially achieve a similar performance improvement. Examples for suitable inorganic oxidizers include chlorides, chlorates, perchlorates or hypochlorides of potassium, sodium, lithium, magnesium, calcium etc.; or peroxymonosulfate salts like for example $NaHSO_5$. Examples of Li acceptors include for example $AlPO_4$, $Li_3AlF_6$, $AlF_3$, etc.

The invention is further illustrated in the Examples below. In the Examples, the following analysis techniques are used:

a) Measurement of soluble base content by pH titration: two steps are performed: (a) the preparation of solution, and (b) pH titration. The detailed explanation of each step is as follows:

Step (a): The preparation of solution: powder is immersed in deionized water and stirred for 10 min in a sealed glass flask. 2.5 g of powder and 100 ml of deionized water are used. After stirring, to dissolve the base, the suspension of powder in water is filtered to get a clear solution.

Step (b): pH titration: 90 ml of the clear solution prepared in step (a) is used for pH titration by using 0.1M HCl. The flow rate is 0.5 ml/min and the pH value is recorded each 3 seconds. The pH titration profile (pH value as a function of added HCl) shows two clear equivalence (or inflection) points. The first equivalence point (corresponding to a HCl quantity of EP1) at around pH 8.4 results from the reaction of $OH^-$ and $CO_3^{2-}$ with $H^+$. The second equivalence point (corresponding to a HCl quantity of EP2) at around pH 4.7 results from the reaction of $HCO_3^-$ with $H^+$. It is assumed that the dissolved base in deionized water is either LiOH (with a quantity 2*EP1−EP2) or $Li_2CO_3$ (with a quantity 2*(EP2−EP1)). The obtained values for LiOH and $Li_2CO_3$ are the result of the reaction of the surface with deionized water.

The following definitions are used for data analysis:

LiOH (wt %) is the weight percentage of the amount of LiOH over the amount of sample.

$Li_2CO_3$ (wt %) is the weight percentage of the amount of $Li_2CO_3$ over the amount of sample.

Total base (μmol/g) is the amount of LiOH and $Li_2CO_3$ over a gram of sample, i.e. the amount in micro mol of HCL needed to neutralize the base of 1 g of cathode material.

b) XRD powder diffraction: the diffraction patterns are collected with a Rigaku X-Ray Diffractometer (D/MAX-2200/PC). The scan speed is set at continuous scanning at 1 deg per minute. The step-size is 0.02 deg. Scans are performed between 15 and 85 degree. To obtain accurate lattice parameters scanning is between 17 and 144 degree, but regions without peaks are excluded to save measurement time. The XRD patterns are analyzed by Rietveld refinement using a semi-automatized TOPAS software. The TOPAS software delivers accurate lattice constants. To prevent fluctuations the room temperature is kept near to 24° C. all the time.

c) Electrochemical testing (coin cell): lithium ion secondary coin cell-type batteries are prepared and tested by the following steps: (a) The preparation of a positive electrode, (b) Coin cell assembly, and (c) Coin cell testing. The detailed explanation of each step is as follows:

Step (a): The preparation of a positive electrode: a slurry that contains the electrochemical active material, a conductor, a binder and a solvent is prepared by a homogenizing process. The formulation comprising the electrochemical active material, conductor and binder is 90:5:5. Conductive carbon black (Super P, produced by Timcal), PVDF polymer (KF#9305, by Kureha), 1-Methyl-2-Pyrrolidone (NMP, by Sigma-Aldrich) are used as a conductor, a solution of a binder, and a solvent, respectively. These materials are homogenized in a metal cup for 45 minutes by using a homogenizer (HF-93, by SMT). The homogenized slurry is spread on one side of an aluminum foil using a doctor blade coater. It is dried in an oven at 120° C., pressed using a calendaring tool, and dried again in a vacuum oven to fully remove the solvent.

Step (a) may thus be expressed as follows: A method for preparing of a positive electrode for a rechargeable lithium battery, comprising the steps of:
providing a Li metal (M) oxide electroactive material,
providing an inorganic oxidizing chemical compound,
providing a chemical that is a Li-acceptor,
mixing the Li metal (M) oxide, the oxidizing compound and the Li-acceptor, and
heating the mixture at a temperature between 300 and 800° C. in an oxygen comprising atmosphere, thereby obtaining a positive electrode material comprising a Li metal (M) oxide electroactive material, and between 0.15 and 5 wt % of a $LiNaSO_4$ secondary phase,
preparing a slurry comprising the positive electrode material, a conductor, a binder and a solvent,
spreading the slurry on one side of an aluminum foil,
drying the foil in an oven,
pressing the dried foil using a calendaring tool,
drying the pressed foil in a vacuum oven thereby removing the solvent.

Step (b): Coin cell assembly: a coin cell is assembled in a glovebox which is filled with an inert gas (argon). A separator (SK Innovation) is located between the positive electrode and a piece of lithium foil used as negative electrode. 1M $LiPF6$ in EC/DMC (1:2) is used as electrolyte, dropped between separator and electrodes.

Step (c): Coin cell testing: coin cell tests in the present invention follow the procedure shown in Table 1. A C-rate can be defined as an inverse number of an hour to charge or discharge 160 mAh/g. For example, 5C refers to a current of 800 mA/g and this current will fully charge or discharge the cell in ⅕ hour. "E-Curr" and "V" stands for the end current and cut-off voltage, respectively. At the first cycle, the DQ1 (discharge capacity of the first cycle) and IRRQ (irreversible capacity) are determined. The rate performance can be calculated from the second to the sixth cycle. The seventh cycle is repeated fifty times to obtain information on the cycle life. The following definitions are used in the data analysis:

CQ1 (charge capacity) and DQ1 (discharge capacity) is the capacity during the first cycle.
IRRQ (irreversible capacity) is the ratio of irreversible capacity over charge capacity during the first cycle.
Fade rate per 100 cycles is the ratio of the faded discharge capacity after 100 cycles. This value is an interpolated value from the fade rate after 25 cycles.

TABLE 1

Cycling schedule of coin cell test.

| | | Charge | | | Discharge | | |
|---|---|---|---|---|---|---|---|
| Cycle # | Times | C-rate | Voltage (V) | Type | C-rate | Voltage (V) | Type |
| 1 | 1 | 0.10 | 4.3 | CC | 0.10 | 3.0 | CC |
| 2 | 1 | 0.25 | 4.3 | CC/CV | 0.20 | 3.0 | CC |
| 3 | 1 | 0.25 | 4.3 | CC/CV | 0.50 | 3.0 | CC |
| 4 | 1 | 0.25 | 4.3 | CC/CV | 1.00 | 3.0 | CC |
| 5 | 1 | 0.25 | 4.3 | CC/CV | 2.00 | 3.0 | CC |
| 6 | 1 | 0.25 | 4.3 | CC/CV | 3.00 | 3.0 | CC |
| 7 | 1 | 0.25 | 4.5 | CC/CV | 0.10 | 3.0 | CC |
| 8 | 1 | 0.25 | 4.5 | CC/CV | 1.00 | 3.0 | CC |
| 9-33 | 25 | 0.25 | 4.5 | CC/CV | 1.00 | 3.0 | CC |
| 34 | 1 | 0.25 | 4.5 | CC/CV | 0.10 | 3.0 | CC |
| 35 | 1 | 0.25 | 4.5 | CC/CV | 1.00 | 3.0 | CC |
| 36-60 | 25 | 1.00 | 4.5 | CC | 1.00 | 3.0 | CC |

Comparative Example 1: (C.Ex1): Layered NMC (622) Material

The same commercial $Li_{0.1}(Ni_{0.6}Mn_{0.2}Co_{0.2})_{0.99}O_2$ (Cellcore G2-HX12, Umicore) is used as a bare material in the present example. The tests are carried out in the same manner as in Example 1, except that $Na_2S_2O_8$ is not added and blended with the bare material. Comparative Example 1 further gives heat treat reference samples for Example 1.

Table 2 shows the results of the pH titration and coin cell tests (as described before) for the samples in Example 1 and Comparative Example 1. Ex1 is the mixture of C.Ex1 and $Na_2S_2O_8$ before heating. Ex1A and Ex1B are the materials after heating of Ex1 at 200° C. and 400° C. for 5 hours, respectively. For comparison, also C.Ex1 is heated at 200° C. and 400° C. for 5 hours, resulting in C.Ex1A and C.Ex1B respectively. Ex1 has a lower discharge capacity and similar base content value compared to C.Ex1. However, this base content is significantly reduced and the capacity is recovered by heat treatment at 400° C. Also, cycle life is improved a lot. Ex1B is in fact showing the best overall results. The comparison between Ex1B and C.Ex1B shows that these improved properties is not the effect of only heat treatment, but it is the result of the blend with $Na_2S_2O_8$.

TABLE 2

Results of pH titration and coin cell tests for Example 1 and Comparative Example 1.

| | | Heating | Base contents | | | Coin cell | | Fade |
|---|---|---|---|---|---|---|---|---|
| Sample | Blending | Temp. (° C.) | LiOH (wt %) | $Li_2CO_3$ (wt %) | Base (µmol/g) | DQ1 (mAh/g) | IRRQ (%) | (0.1 C.) (%/100) |
| Ex1 | $Na_2S_2O_8$ | — | 0.25 | 0.24 | 166.7 | 171.3 | 11.7 | 1.99 |
| Ex1A | | 200 | 0.20 | 0.19 | 137.2 | 172.7 | 11.5 | 1.83 |
| Ex1B | | 400 | 0.19 | 0.04 | 92.7 | 179.9 | 9.7 | 1.74 |
| C. Ex1 | | — | — | 0.26 | 0.24 | 174.3 | 177.7 | 10.7 | 2.70 |
| C. Ex1A | | 200 | 0.23 | 0.24 | 163.6 | 177.5 | 10.8 | 3.05 |
| C. Ex1B | | 400 | 0.23 | 0.24 | 158.2 | 179.8 | 10.5 | 2.32 |

Example 1: Oxidized Layered NMC (622) Material

A commercial $Li_{1.01}(Ni_{0.6}Mn_{0.2}Co_{0.2})_{0.99}O_2$ (Cellcore G2-HX12, Umicore) is used as a bare material in the present example. The oxidizing treatment consists of a dry blending—coating of the cathode material with $Na_2S_2O_8$ (sodium persulfate), followed by a heat treatment. In the present example, 1.8 wt % of $Na_2S_2O_8$ is blended with the NMC (622) material (50 g scale) using a 3D tubular mixer in a small plastic bottle with $ZrO_2$ balls.

Example 2: Oxidized Layered NMC (532) Material

A commercial $Li_{1.01}(Ni_{0.5}Mn_{0.3}Co_{0.2})_{0.99}O_2$ (Celicore TX10, Umicore) is used as a bare material in the present example. The oxidizing treatment consists of a dry coating of cathode material by $Na_2S_2O_8$ (sodium persulfate), followed by a heat treatment. In the present example, 1.8 wt % of $Na_2S_2O_8$ is blended with layered NMC (532) material (4 kg scale) using a 5 L Henschel type mixer. After blending, the mixture is heated at 375° C. for 5 hours. For comparison, C.Ex2 is the bare material which is a commercial $Li_{1.01}(Ni_{0.5}Mn_{0.3}Co_{0.2})_{0.99}O_2$ (Cellcore TX10, Umicore). Table 3 shows the results of pH titration and coin cell tests for the samples in Example 2 and Comparative Example 2:

Similar as in Example 1, reduced base contents and improved electrochemical properties are observed after oxidizing treatment (blending with $Na_2S_2O_8$ and heat treatment).

TABLE 3

Results of pH titration and coin cell tests for Example 2 and Comparative Example 2.

| Sample | Blending | Heating Temp. °C. | Base contents | | | Coin cell | | Fade |
|---|---|---|---|---|---|---|---|---|
| | | | LiOH (wt %) | $Li_2CO_3$ (wt %) | Base (μmol/g) | DQ1 (mAh/g) | IRRQ (%) | (0.1 C.) (%/100) |
| Ex2 | $Na_2S_2O_8$ | 375 | 0.06 | 0.02 | 28.3 | 170.3 | 10.3 | 0.49 |
| C. Ex2 | — | — | 0.09 | 0.13 | 72.0 | 168.8 | 11.5 | 1.80 |

Example 3: Aluminum-Coated and Oxidized Layered NMC (622) Material

An oxidizing treatment is applied to 2 samples:
1) A commercial $Li_{1.01}(Ni_{0.6}Mn_{0.2}Co_{0.2})_{0.99}O_2$ (Cellcore G3-HX12, Umicore) is used as a bare material in the present example.
2) A quantity of commercial G3-HX12 that is dry coated by blending with $Al_2O_3$ (1000 ppm per kg of cathode).

The oxidizing treatment consists of a dry coating of the cathode material by $Na_2S_2O_8$ (sodium persulfate), followed by a heat treatment. In the present example, 1.8 wt % of $Na_2S_2O_8$ is blended with the bare material or the $Al_2O_3$ dry coated material, respectively. After blending with $Na_2S_2O_8$, 2 kg of mixture is heated at 375° C. for 5 hours. Table 4 shows the results of pH titration and coin cell tests for the samples in Example 3 and Comparative Example 3. C.Ex3 is the bare material which is the commercial $Li_{1.01}(Ni_{0.6}Mn_{0.2}Co_{0.2})_{0.99}O_2$ (Cellcore G3-HX12, Umicore). Ex3A is the oxidized NMC (622) material and Ex3B is the Al-coated and oxidized NMC (622) material. Both Ex3A and Ex3B have significantly reduced base contents and improved cycle life compared to C.Ex3. Furthermore, blending with Aluminum leads to an even more improved cycle life, without significant loss of capacity.

Example 4: Oxidized NCA Material

A commercial 1.5 mol % Al doped $Li(Ni_{0.8}Co_{0.15})O_2$, referred to as "NCA" (Cellcore QX, Umicore) is used as a bare material in the present example. The oxidizing treatment consists of a dry coating of the cathode material with $Na_2S_2O_8$ (sodium persulfate), followed by a heat treatment. In the Example, different amounts of $Na_2S_2O_8$ are blended with the NCA material (50 g scale) using a 3D tubular mixer in a small plastic bottle with $ZrO_2$ balls. After blending, the mixture is heated at 375° C. for 5 hours in an oxygen containing atmosphere.

Table 5 shows the results of the pH titration and coin cell tests for the samples in Example 4 and Comparative Example 4. C.Ex4 is the bare material which is the commercial Al doped $Li(Ni_{0.85}Co_{0.15})O_2$ (Cellcore QX, Umicore). C.Ex4 is blended with 0.3, 0.7, 1.2, and 1.8 wt % of $Na_2S_2O_8$ and heated, resulting in Ex4A, Ex4B, Ex4C, and Ex4D, respectively. The introduction of $Na_2S_2O_8$ always leads to reduced base contents, and the reduction is increasing as the amount of $Na_2S_2O_8$ increases. The coincell cycle stability test for NCA material is performed at 4.3 V-3.0V. The trend of discharge capacity and cycle stability is different for different amounts of $Na_2S_2O_8$ addition. When the amount of $Na_2S_2O_8$ increases, the discharge capacity decreases and the cycle stability is improved. Depending on the application, the amount of $Na_2S_2O_8$ can be optimized to find an equilibrium between capacity and cycle stability performances.

TABLE 4

Results of pH titration and coin cell tests for Example 3 and Comparative Example 3.

| Sample | Blending | Heating Temp. (° C.) | Base contents | | | Coin cell | | Fade |
|---|---|---|---|---|---|---|---|---|
| | | | LiOH (wt %) | $Li_2CO_3$ (wt %) | Base (μmol/g) | DQ1 (mAh/g) | IRRQ (%) | (0.1 C.) (%/100) |
| Ex3A | $Na_2S_2O_8$ | 375 | 0.22 | 0.04 | 102.3 | 180.5 | 8.7 | 0.62 |
| Ex3B | $Na_2S_2O_8$ + $Al_2O_3$ | | 0.21 | 0.05 | 103.3 | 180.3 | 8.6 | 0.37 |
| C. Ex3 | — | — | 0.31 | 0.15 | 169.1 | 180.0 | 9.8 | 1.63 |

TABLE 5

Results of pH titration and coin cell tests for Example 4 and Comparative Example 4.

| Sample | Amount of Na$_2$S$_2$O$_8$ (wt %) | Heating Temp. ° C. | Base contents | | | Coin cell | | Fade |
| --- | --- | --- | --- | --- | --- | --- | --- | --- |
| | | | LiOH (wt %) | Li$_2$CO$_3$ (wt %) | Base (µmol/g) | DQ1 (mAh/g) | IRRQ (%) | (0.1 C.) (%/100) |
| Ex4A | 0.3 | 375 | 0.20 | 0.11 | 113.5 | 196.9 | 10.5 | 11.29 |
| Ex4B | 0.7 | | 0.17 | 0.07 | 90.2 | 195.4 | 10.7 | 9.95 |
| Ex4C | 1.2 | | 0.14 | 0.06 | 72.0 | 194.3 | 11.5 | 8.54 |
| Ex4D | 1.8 | | 0.14 | 0.06 | 74.2 | 189.5 | 12.2 | 5.60 |
| C. Ex4 | — | — | 0.23 | 0.16 | 141.1 | 198.4 | 10.3 | 13.19 |

Example 5: Full Cell Tests

Using the samples of Example 3, full cells are prepared. A graphite type anode is used as a counter-electrode. The typical capacity of the full cells is 640 mAh and this value is used to determine the current at each C-rate. Loading weight of cathode material and anode material is 12.8 mg/cm$^2$ and 7.8 mg/cm$^2$, respectively. The Example shows the results of (a) bulging test and (b) cycle life test.

The detailed procedure is as follows:

(a) Bulging test: the fully charged cells are stored in an oven at 90° C. for 4 hours. The reaction between active material and electrolyte generates gas in a full cell, resulting in the increase of battery thickness (bulging). The thickness of the full cells is measured before and after storing in the oven. The reported value is the ratio of increased full cell thickness, expressed in % increase versus the initial thickness.

(b) Cycle life test: the full cells are cycled several hundred times between 4.2 V and 2.7 V or between 4.35V to 3.0V to measure capacity fading during cycling. Charging is performed in constant current/constant voltage (CC/CV) mode at a 1C rate using a cutoff current of 32 mA, and discharge is performed in CC mode at 1C rate. The cycle life tests are performed at room temperature (25° C.) and at elevated temperature (45° C.).

Table 6 shows the bulging test results for Ex3A, Ex3B, and C.Ex3. Mostly, the bulging ratio is related to the base content. The oxidizing treatment leads to significantly reduced base contents, resulting accordingly in a reduced bulging ratio.

TABLE 6

Bulging test result for Example 3 and Comparative Example 3.

| Sample | Blending | Heating Temp. (° C.) | Bulging ratio (%) |
| --- | --- | --- | --- |
| Ex3A | Na$_2$S$_2$O$_8$ | 375 | 26.3 |
| Ex3B | Na$_2$S$_2$O$_8$ + Al$_2$O$_3$ | | 30.3 |
| C. Ex3 | — | — | 72.2 |

FIG. 1 and Table 7a show the normal voltage (4.2V-2.7V) cycle life test results of Ex3A, Ex3B, and C.Ex3 at 25° C. (FIG. 1(a)) and 45° C. (FIG. 1(b)—note that the results for Ex 3A & B overlap), after 200, 400, 800 and 1200 cycles (the Figures even go further). The cycle life test at 45° C. is an accelerated test to investigate the property under real working conditions. The cycle life is improved by oxidizing treatment in the tests at both 25° C. and 45° C. Al$_2$O$_3$ coating with Na$_2$S$_2$O$_8$ on the NMC (622) material leads to a more improved cycle life at room temperature. In FIGS. 1(a) & (b) the top line is for Ex3B, partly overlapping with the middle for Ex3A, the bottom line for C.Ex3.

TABLE 7a

Capacity ratio of full cell tests at each 200 cycle for Example 3 and Comparative Example 3, cycled between 4.2 V and 2.7 V.

| Sample | Testing Temp. (° C.) | Capacity ratio (%) | | | | |
| --- | --- | --- | --- | --- | --- | --- |
| | | Cycle 1 | Cycle 200 | Cycle 400 | Cycle 800 | Cycle 1200 |
| Ex3A | 25 | 100.0 | 99.4 | 98.1 | 94.6 | 90.1 |
| Ex3B | | 100.0 | 100.3 | 99.4 | 96.6 | 93.4 |
| C. Ex3 | | 100.0 | 97.9 | 96.5 | 92.0 | 85.8 |
| Ex3A | 45 | 100.0 | 97.5 | 95.1 | 91.4 | 88.7 |
| Ex3B | | 100.0 | 97.9 | 95.5 | 91.8 | 89.1 |
| C. Ex3 | | 100.0 | 98.3 | 94.3 | 86.1 | — |

Figure 2:
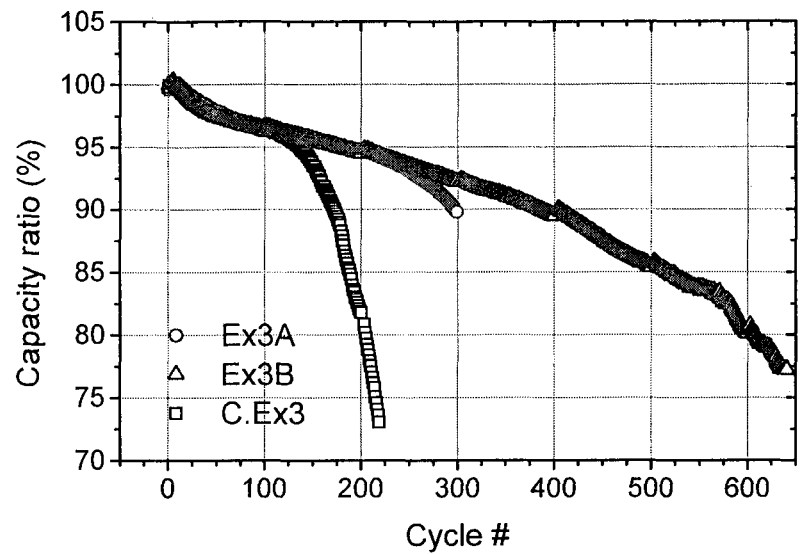
FIG. 2: Full cell cycle life test results of oxidized NMC (622) and normal NMC (622) at (a) 25° C. and (b) 45° C. The testing voltage is between 4.35V and 3.0V.
Figure 2:
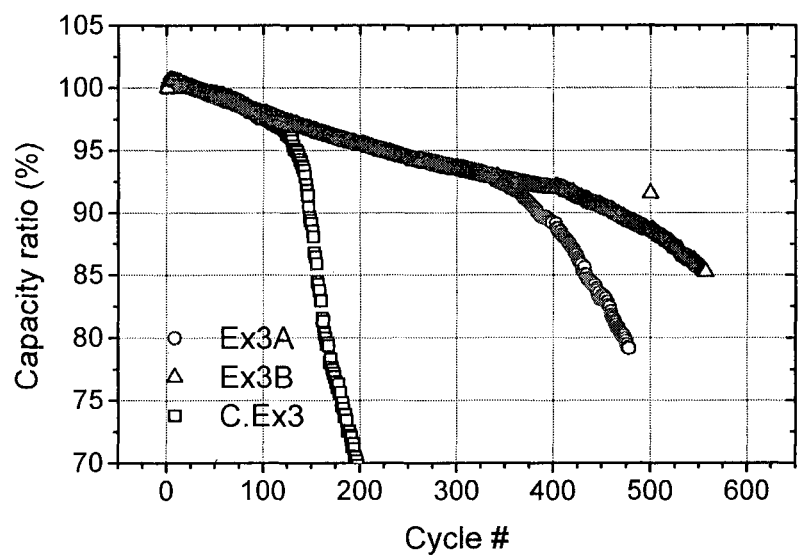

FIG. 2 and Table 7b show the high voltage (4.35V-3.0V) cycle life test results of Ex3A, Ex3B, and C.Ex3 at 25° C. (FIG. 2(a)) and 45° C. (FIG. 2(b)), after 100, 200, 300 and 400 cycles (the Figures even go further). The cycle life at high voltage test is also improved by oxidizing treatment in the tests at both 25° C. and 45° C. Al$_2$O$_3$ coating with Na$_2$S$_2$O$_8$ on the NMC (622) material leads to a more improved cycle life at room temperature. Even the cycle stability at elevated temperature (45° C.) is better than at room temperature (25° C.) in case of oxidized NMC (622). In FIG. 2(a) the top line is for Ex3B, the middle for Ex3A, the bottom line for C.Ex3. In FIG. 2(b), the top line is the overlap of both lines of Ex3B and Ex3A, the bottom line is for C.Ex3.

TABLE 7b

Capacity ratio of full cell tests at each 200 cycle for Example 3 and Comparative Example 3, cycled between 4.35 V and 3.0 V.

| Sample | Testing Temp. (° C.) | Capacity ratio (%) | | | | |
| --- | --- | --- | --- | --- | --- | --- |
| | | Cycle 1 | Cycle 100 | Cycle 200 | Cycle 300 | Cycle 400 |
| Ex3A | 25 | 100.0 | 96.6 | 94.6 | 89.8 | — |
| Ex3B | | 100.0 | 96.3 | 94.5 | 92.2 | 89.9 |
| C. Ex3 | | 100.0 | 96.3 | 81.8 | — | — |
| Ex3A | 45 | 100.0 | 98.1 | 95.6 | 93.8 | 89.2 |
| Ex3B | | 100.0 | 97.9 | 95.5 | 93.4 | 92.0 |
| C. Ex3 | | 100.0 | 97.5 | 69.8 | — | — |

Example 6: Floating Current Test

Using the samples of Example 3, full cells are prepared. A graphite type anode is used as a counter-electrode. The Example shows the results of a floating current test.

The detailed procedure is as follows:

(a) Floating current test: a full cell is charged up to 4.6 V by CC/CV mode (constant current and constant voltage) at 50° C. and the voltage is kept for six days (144 hours). The current value as a function of time can be converted to a capacity value, called "total capacity".

(b) Anode ICP: after the floating test, the full cell is disassembled. The amount of metal in the anode side is measured by ICP (inductively coupled plasma) method.

Table 8 shows the result of the floating current test and anode ICP for Example 3 and Comparative Example 3. Ex3A and Ex3B have a lower total capacity than C.Ex3. A high total capacity means there are unnecessary reactions between the active material and the electrolyte during fully charged storage. Clearly, the oxidizing treatment prevents the unnecessary reaction in the full cell. Also, Ex3A and Ex3B have lower Ni contents in the disassembled anode than C.Ex3. Usually, the "total capacity" correlates well with the metal dissolution of cathode material. The metal dissolution can cause a safety issue and an inferior open circuit voltage. By the oxidizing treatment, the metal dissolution is effectively reduced

TABLE 8

Relative total capacity of a floating current test and Ni content in the disassembled anode

| Sample | Relative total capacity (%) | Relative Ni contents in anode (%) |
| --- | --- | --- |
| Ex3A | 57.5 | 71.7 |
| Ex3B | 46.6 | 67.3 |
| C. Ex3 | 100.0 | 100.0 |

The relative total capacity is expressed in % versus the comparative example, which means that only 57.5 or 46.6% of the capacity was needed to keep the upper voltage of the charged cell at 4.6V for Ex3A and 3B respectively.

Example 7: XRD Analysis for Oxidized NMC (622)

Figure 3:
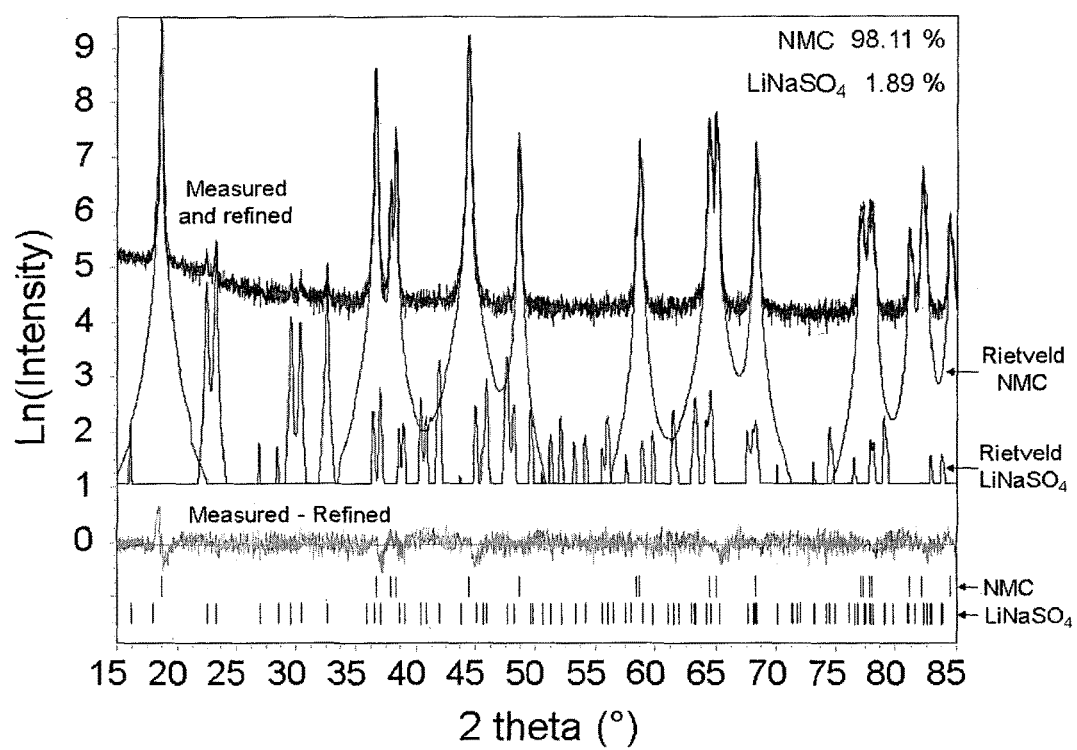
FIG. 3: XRD Rietveld refinement for oxidized NMC (622).
Figure 4:
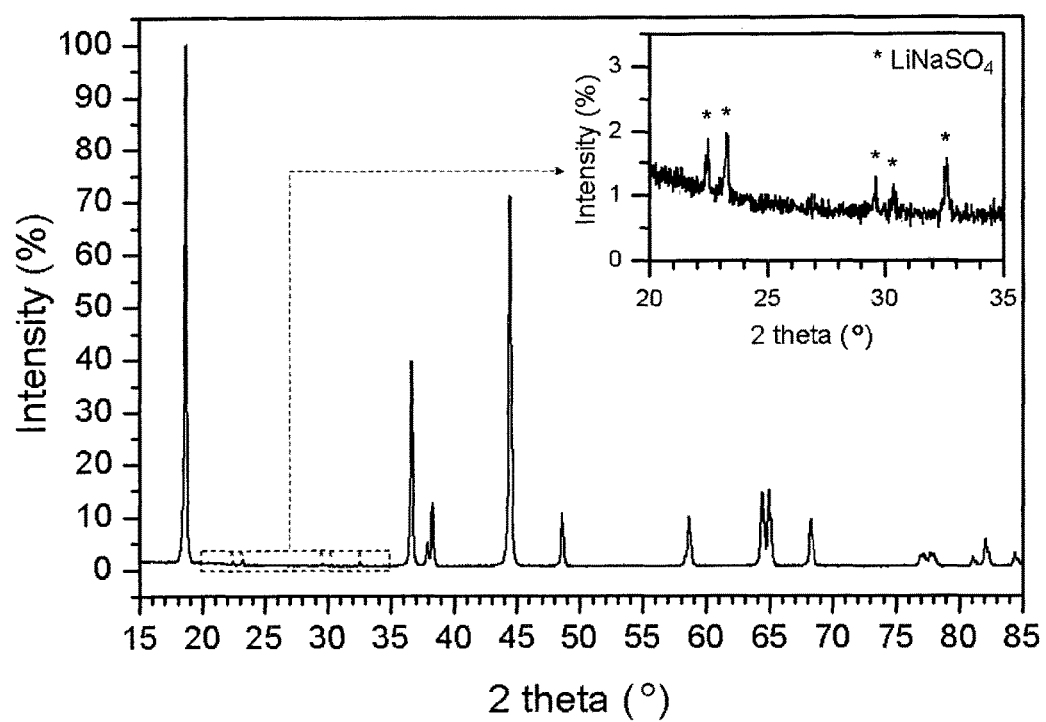
FIG. 4: XRD measurement for oxidized NMC (622): 20-35° magnification view.

An XRD measurement (as described before) is carried out on Ex3A (Oxidized $Li_{1.01}(Ni_{0.6}Mn_{0.2}Co_{0.2})_{0.99}O_2$). For Rietveld refinement, the crystal structure of $LiNaSO_4$ is determined by following the literature (e.g. in Morosin et al., "The Crystal Structure of Lithium Sodium Sulfate", Acta Crystallographica 22 (1967) 906-910). Here the space group of $LiNaSO_4$ is P31c and the lattice constant a and c is 7.62 Å and 9.85 Å, respectively. FIG. 3 shows the result of the Rietveld refinement. The refinement result clearly shows the presence of $LiNaSO_4$ besides the normal layered NMC domain. The refined lattice constants a and c of $LiNaSO_4$ are 7.63 Å and 9.84 Å, which shows good agreement with the above literature. FIG. 4 shows the diffraction pattern with linear intensity scale with magnification view from 20° to 35°, which also clearly shows the presence of $LiNaSO_4$.

Example 8: Process for Oxidizing Treatment

Two processes to blend $Na_2S_2O_8$ and a cathode material are possible: a dry process and a wet process. The dry process refers to blending of dry $Na_2S_2O_8$—preferably submicron sized-particles with a cathode material using a blending equipment, as illustrated in Ex. 1-3. A wet process refers to blending of a $Na_2S_2O_8$ solution with a cathode material. In the present Example, for the dry process, 1.8 wt % of $Na_2S_2O_8$ powder is blended with $Li_{1.01}(Ni_{0.6}Mn_{0.2}Co_{0.2})_{0.99}O_2$ (Cellcore G2-HX12, Umicore) (50 g scale) using a 3D tubular mixer in a small plastic bottle with $ZrO_2$ balls. After blending, the mixture is heated at 400° C. for 5 hours. For the wet process, 1.8 wt % of $Na_2S_2O_8$ solution is blended with $Li_{1.01}(Ni_{0.6}Mn_{0.2}Co_{0.2})_{0.99}O_2$ (Cellcore G2-HX12, Umicore) (1 kg scale) using an overhead stirrer in a round type vessel.

40 wt % of $H_2O$ is added to the G2-HX12 for making the slurry of the mixture. After blending, the slurry is dried at 120° C. in a conventional oven for 12 hours and the dry material is heated at 400° C. for 5 hours.

Table 9 shows the results of the pH titration of the sample in Example 8 and Comparative Example 8, the latter being the bare material which is a commercial $Li_{1.01}(Ni_{0.6}Mn_{0.2}Co_{0.2})_{0.99}O_2$ (Cellcore G2-HX12, Umicore). Ex8A uses the dry process and Ex8B is the material using the wet process. Ex8A and Ex8B have reduced based contents compared to C.Ex8. It is shown that the dry process is more effective to reduce the $Li_2CO_3$ content than the wet process. Diffraction peaks of $LiNaSO_4$ are detected in the XRD diffraction pattern.

TABLE 9

Results of pH titration for Example 8 and Comparative Example 8.

| | | Base contents | | |
| --- | --- | --- | --- | --- |
| Sample | Blending type | LiOH (wt %) | $Li_2CO_3$ (wt %) | Base (µmol/g) |
| Ex8A | Dry | 0.19 | 0.04 | 92.7 |
| Ex8B | Wet | 0.18 | 0.17 | 119.1 |
| C. Ex8 | — | 0.26 | 0.24 | 174.3 |

Example 9: High Temperature Treatment

A commercial $Li_{1.01}(Ni_{0.6}Mn_{0.2}Co_{0.2})_{0.99}O_2$ (Cellcore G2-HX12, Umicore) is used as a bare material in this Example. The oxidizing treatment consists of a dry coating of the cathode material with $Na_2S_2O_8$ (sodium persulfate), followed by a heat treatment. In the Example, 1.8 wt % of $Na_2S_2O_3$ is blended with the NMC (622) material (50 g scale) using a 3D tubular mixer in a small plastic bottle with $ZrO_2$ balls. After blending, the mixture is heated at either 400° C., or at 800° C. for 5 hours to determine the right temperature range for the oxidizing treatment.

Table 10 shows the results of the pH titration and coin cell tests for the samples in Example 9 and Comparative Example 9, the latter being bare material which is a commercial $Li_{1.01}(Ni_{0.6}Mn_{0.2}Co_{0.2})_{0.99}O_2$ (Cellcore G2-HX12, Umicore). Ex9A and Ex9B are the material heated at 400° C. and 800° C. after blending. Ex9B shows a high base contents and low discharge capacity compared to Ex9A. The data show that if the heat treatment is performed at a too high temperature, then not all the beneficial effects of the oxidizing treatment are obtained (the fade rate is good).

TABLE 10

Results of pH titration and coin cell tests for Example 9 and Comparative Example 9.

| Sample | Heating Temp. °C. | Base contents | | Base (µmol/g) | Coin cell | | |
|---|---|---|---|---|---|---|---|
| | | LiOH (wt %) | $Li_2CO_3$ (wt %) | | DQ1 (mAh/g) | IRRQ (%) | Fade (0.1 C.) (%/100) |
| Ex9A | 400 | 0.19 | 0.04 | 92.7 | 179.9 | 9.7 | 1.74 |
| Ex9B | 800 | 0.17 | 0.31 | 155.6 | 172.6 | 12.6 | 0.78 |
| C. Ex9 | — | 0.26 | 0.24 | 174.3 | 177.7 | 10.7 | 2.70 |

The invention claimed is:

1. A positive electrode material for a rechargeable lithium battery comprising a Li metal (M) oxide electroactive material, and between 0.15 and 5 wt % of a $LiNaSO_4$ secondary phase, wherein $M=Ni_{1-x-y}M'_xCo_y$, with $M'=Mn_{1-z}Al_z$, $0 \leq z \leq 1$, $0.1 \leq y \leq 0.4$ and $x+y \leq 0.5$.

2. The positive electrode material of claim 1, wherein $1-y-2x>0.2$.

3. The positive electrode material of claim 1, wherein the Li metal oxide has the general formula $Li_{1+a'}M_{1-a'}O_2$, with $a'<a$ and $0.9 \leq (1+a')/(1-a) \leq 1.15$.

4. The positive electrode material of claim 1, wherein the mass fraction of the $LiNaSO_4$ secondary phase is between 0.2 and 2 wt %.

5. The positive electrode material of claim 1, wherein the material comprises a core comprising the Li metal (M) oxide and a coating comprising the $LiNaSO_4$ secondary phase.

6. The positive electrode material of claim 5, wherein the $LiNaSO_4$ coating is covered by a second coating comprising one or more of $Al_2O_3$, $LiAlO_2$, LiF or MgO, and wherein the second coating represents up to 1 wt % of the material.

7. The positive electrode material of claim 1, wherein the secondary phase further comprises up to 1 wt % of one or more compounds selected from the group consisting of $Al_2O_3$, $LiAlO_2$, LiF, $Li_3PO_4$, MgO and $Li_2TiO_3$.

8. The positive electrode material of claim 1, wherein the Li metal (M) oxide is doped with up to 2 mol % of one or more elements selected from the group consisting of Al, Ti, Mg and Zr.

9. The positive electrode material of claim 1, wherein the Li metal (M) oxide is doped with up to 0.2 mol % of one or more elements selected from the group consisting of Ca, Sr, Si, F, P and K.

10. A method for preparing the positive electrode material of claim 1, comprising:

providing a Li metal (M) oxide electroactive material, wherein the Li metal oxide has the general formula $Li_{1+a'}M_{1-a'}O_2$, with $a'<a$ and $0.9 \leq (1+a')/(1-a) \leq 1.15$, and $M=Ni_{1-x-y}M'_xCo_y$, with $M'=Mn_{1-z}Al_z$, $0 \leq z \leq 1$, $0.1 \leq y \leq 0.4$ and $x+y \leq 0.5$, providing an inorganic oxidizing chemical compound, providing a chemical that is a Li-acceptor, mixing the Li metal (M) oxide, the oxidizing compound and the Li-acceptor, and heating the mixture at a temperature between 300 and 800° C. in an oxygen comprising atmosphere.

11. The method according to claim 10, wherein the inorganic oxidizing chemical compound comprises $NaHSO_5$ or either one of a chloride, a chlorate, a perchlorate or a hypochloride of either one of potassium, sodium, lithium, magnesium or calcium.

12. The method according to claim 10, wherein the Li-acceptor chemical comprises one of $AlPO_4$, $Li_3AlF_6$ or $AlF_3$.

13. The method according to claim 10, wherein the inorganic oxidizing chemical compound and the Li-acceptor chemical are the same compound, being one of $Li_2S_2O_8$, $H_2S_2O_8$ or $Na_2S_2O_8$.

14. The method according to claim 13, wherein the inorganic oxidizing chemical compound and the Li-acceptor chemical are $Na_2S_2O_8$, and wherein $Na_2S_2O_8$ is mixed with the Li metal (M) oxide in a dry process.

15. The method according to claim 13, wherein a nano-sized $Al_2O_3$ powder is provided as a further Li-acceptor chemical.

16. The method according to claim 10, wherein the mass fraction of the Li metal (M) oxide in the mixture is between 95 and 99.8 wt %.

17. The method according to claim 10, wherein the heating temperature is between 350 and 450° C.

18. The method according to claim 10, wherein the inorganic oxidizing chemical compound and the Li-acceptor chemical are $Na_2S_2O_8$, and wherein $Na_2S_2O_8$ is mixed with the Li metal (M) oxide in a wet process.

* * * * *